(12) United States Patent
Dinh et al.

(10) Patent No.: US 8,769,114 B2
(45) Date of Patent: Jul. 1, 2014

(54) DISTRIBUTING GROUP OF IMAGES ASSOCIATED WITH WEB PAGE VIA NUMBER OF DATA CONNECTIONS LESS THAN NUMBER OF IMAGES IN GROUP

(75) Inventors: Hung T. Dinh, Austin, TX (US); Mansoor A. Lakhdhir, Austin, TX (US); Phong A. Pham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 13/372,200

(22) Filed: Feb. 13, 2012

(65) Prior Publication Data

US 2012/0143909 A1    Jun. 7, 2012

Related U.S. Application Data

(63) Continuation of application No. 10/682,394, filed on Oct. 9, 2003, now Pat. No. 8,156,248.

(51) Int. Cl.
*G06F 15/16* (2006.01)

(52) U.S. Cl.
USPC ........................................................ 709/227

(58) Field of Classification Search
USPC ........................................................ 709/227
See application file for complete search history.

(56) References Cited

U.S. PATENT DOCUMENTS

| | | | |
|---|---|---|---|
| 5,784,610 A * | 7/1998 | Copeland et al. ..................... 1/1 |
| 6,202,061 B1 | 3/2001 | Khosla et al. |
| 6,363,418 B1 | 3/2002 | Conboy et al. |
| 6,438,597 B1 * | 8/2002 | Mosberger et al. ............ 709/227 |
| 6,591,295 B1 | 7/2003 | Diamond et al. |
| 6,631,378 B1 * | 10/2003 | Rosinus et al. ................ 707/802 |
| 6,763,386 B2 | 7/2004 | Davis et al. |
| 6,854,018 B1 * | 2/2005 | Li et al. ......................... 709/240 |
| 6,859,909 B1 | 2/2005 | Lerner et al. |
| 7,054,508 B2 | 5/2006 | Hanamoto |
| 7,082,476 B1 | 7/2006 | Cohen et al. |
| 7,171,443 B2 | 1/2007 | Tiemann et al. |
| 7,627,658 B2 * | 12/2009 | Levett et al. ................... 709/223 |
| 2002/0032027 A1 | 3/2002 | Kirani et al. |
| 2002/0047856 A1 | 4/2002 | Baker |
| 2002/0059243 A1 * | 5/2002 | Gillespie et al. ................. 707/10 |
| 2002/0089549 A1 | 7/2002 | Munro et al. |
| 2002/0116448 A1 | 8/2002 | Copeland et al. |
| 2002/0191867 A1 | 12/2002 | Le et al. |
| 2004/0148308 A1 | 7/2004 | Rajan et al. |
| 2004/0201752 A1 | 10/2004 | Parulski et al. |

(Continued)

OTHER PUBLICATIONS

"File Management Framework 2.0", ITComponentFactory 2002, 4 pages.

(Continued)

*Primary Examiner* — Lance L Barry
(74) *Attorney, Agent, or Firm* — DeLizio Gilliam, PLLC

(57) ABSTRACT

A server can efficiently distribute images for a web page as groups of images. The server receives a request from a client for a group of images associated with a web page. The request encodes an image group identifier and a retrieving function. The server executes the retrieving function with the image group identifier to obtain the group of images. In response to the request, the group of images are transmitted over a number of data communication connections between the client and the server that are less than a number of images in the group of images.

16 Claims, 8 Drawing Sheets

(56) References Cited

U.S. PATENT DOCUMENTS

| | | |
|---|---|---|
| 2004/0250205 A1 | 12/2004 | Conning |
| 2005/0028079 A1 | 2/2005 | Dinh et al. |
| 2005/0080871 A1 | 4/2005 | Dinh et al. |
| 2012/0143909 A1* | 6/2012 | Dinh et al. .................. 707/769 |

OTHER PUBLICATIONS

"U.S. Appl. No. 10/631,057 Final Office Action", Feb. 1, 2006, 15 pages.

"U.S. Appl. No. 10/631,057 Final Office Action", Feb. 21, 2007, 15 pages.

"U.S. Appl. No. 10/631,057 Office Action", Oct. 3, 2005, 11 pages.

"U.S. Appl. No. 10/631,057 Office Action", Aug. 24, 2006, 14 pages.

"U.S. Appl. No. 10/682,394 Final Office Action", Jul. 9, 2008, 7 pages.

"U.S. Appl. No. 10/682,394 Office Action", Dec. 31, 2007, 9 pages.

Von Berg, Alexander, "A Concept for an Electronic Magazine", University of Hanover TERENA-NORDUnet Networking Conference (TNNC) https://www.terena.org/events/archive/tnnc/4A/4A3/4A3.pdf (Obtained from the Internet on Feb. 24, 2012) 1999, 8 pages.

White Paper, "Socrates XML: Product Description Release 1.202", CINCOM 2002, 16 pages.

* cited by examiner

DISTRIBUTING GROUP OF IMAGES ASSOCIATED WITH WEB PAGE VIA NUMBER OF DATA CONNECTIONS LESS THAN NUMBER OF IMAGES IN GROUP

CROSS REFERENCE TO RELATED APPLICATIONS

This continuation application claims benefit of co-pending application U.S. patent application Ser. No. 10/682,394, which was filed on Oct. 9, 2003.

BACKGROUND

Embodiments of the inventive subject matter generally relate to the field of data processing, or, more specifically, distribution of images from a server to client.

In distributing images on data processing systems, documents having many images are slow to load on the client side, and the images are cumbersome to administer on the server side. Consider the following HTML segment:

```
1 <HTML> <HEAD> <TITLE>Business Partner support from IBM
PartnerWorld</TITLE> </HEAD> <BODY> <table width="760"
border="0" cellspacing="0" cellpadding="0"> <img
src="//www.ibm.com/i/v11/m/en/mast_logo.gif" border="0"
alt="IBM" width="150" height="47"/></td> <td width=
"310" class="tbg"><a href="#main"> <img src=
"//www.ibm.com/i/c.gif" border="0" width="1" height="1"
alt="Skip to main content"/></a></td> <table border="0"
cellpadding="0" cellspacing="0"> <form name="Search"
method="get" <input type="hidden" name="v" value=
"11" size="15"/><tr> <img src="http://t1d.www-
1.cacheibm.com/printer.gif" width="23" height="19" alt=
"Link to printable version of page"></td> <tr valign="middle">
<td> <img src="http://t1d.www-1.cacheibm.com/pwhome.jpg"
width="61O" height="52" alt="IBM PartnerWorld home
header graphic" /></td><td><input maxlength="100"
class="input" size="15" name="q" value=""
type="text"/></td><td> <img src="//www.ibm.com/i/v11/
icons/fw.gif" width="16" height="16" alt=""/></td>
</BODY> </HTML>
```

This example HTML segment is an excerpt from the IBM website at http://www.developer.ibm.com. Notice the repeated use of <img> elements. This segment contains five <img> elements, and the document from which this example was excerpted, at the time of this writing, contained 156 <img> elements. For each such element, a browser displaying the document opens a separate TCP/IP connection to a server, and transmits an HTTP request message requesting the image file identified in the 'src' attribute of the <img> element. Each such request eventually results in a corresponding HTTP response message from the server, through still another TCP/IP connection. In addition, each TCP/IP connection requires system calls to establish sockets and transmit TCP/IP 'send' messages, each of which requires a full-blown context switch at the CPU level, recognized by persons of ordinary skill in the art as a heavy computer processing burden. Displaying the document from which this example was excerpted requires 312 TCP/IP connections just for the image transfers. Moreover, this is not at all atypical. Web pages today often contain many images.

Notice also that the 'src' attributes identify image files in several file system locations. In fact, the 'src' attribute can only identify files stored in file system locations. System administrators on the server side must store and manage image files in ways that are cumbersome, with image files often scattered around in different file system locations on different servers. Tracking updates and locating and removing obsolete images are all very cumbersome on file systems. For all these reasons, there is an ongoing need for improved ways of distributing images in data processing systems.

SUMMARY

Embodiments of the inventive subject matter include a method of distributing images from a server for web pages. The server receives a request from a client for a group of images associated with a web page. The request encodes an image group identifier and a retrieving function. The server executes the retrieving function with the image group identifier to obtain the group of images. In response to the request, the group of images are transmitted over a number of data communication connections between the client and the server that are less than a number of images in the group of images.

Embodiments include a method of distributing images from a server for dynamic web pages. The server obtains dynamic server page content responsive to a request from a client for a dynamic server page. The server determines that the dynamic server page content indicates a plurality of images. The server inserts into the dynamic server page content an image group identifier and a first indication that the image group identifier identifies a group of images, which is the plurality of images. For each of the plurality of images, the server inserts into the dynamic server page content a client side file name and a second indication of location for displaying the image by the client. The server transmits to the client the dynamic server page content with the image group identifier, the first indication, the client side file names, and the second indications.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
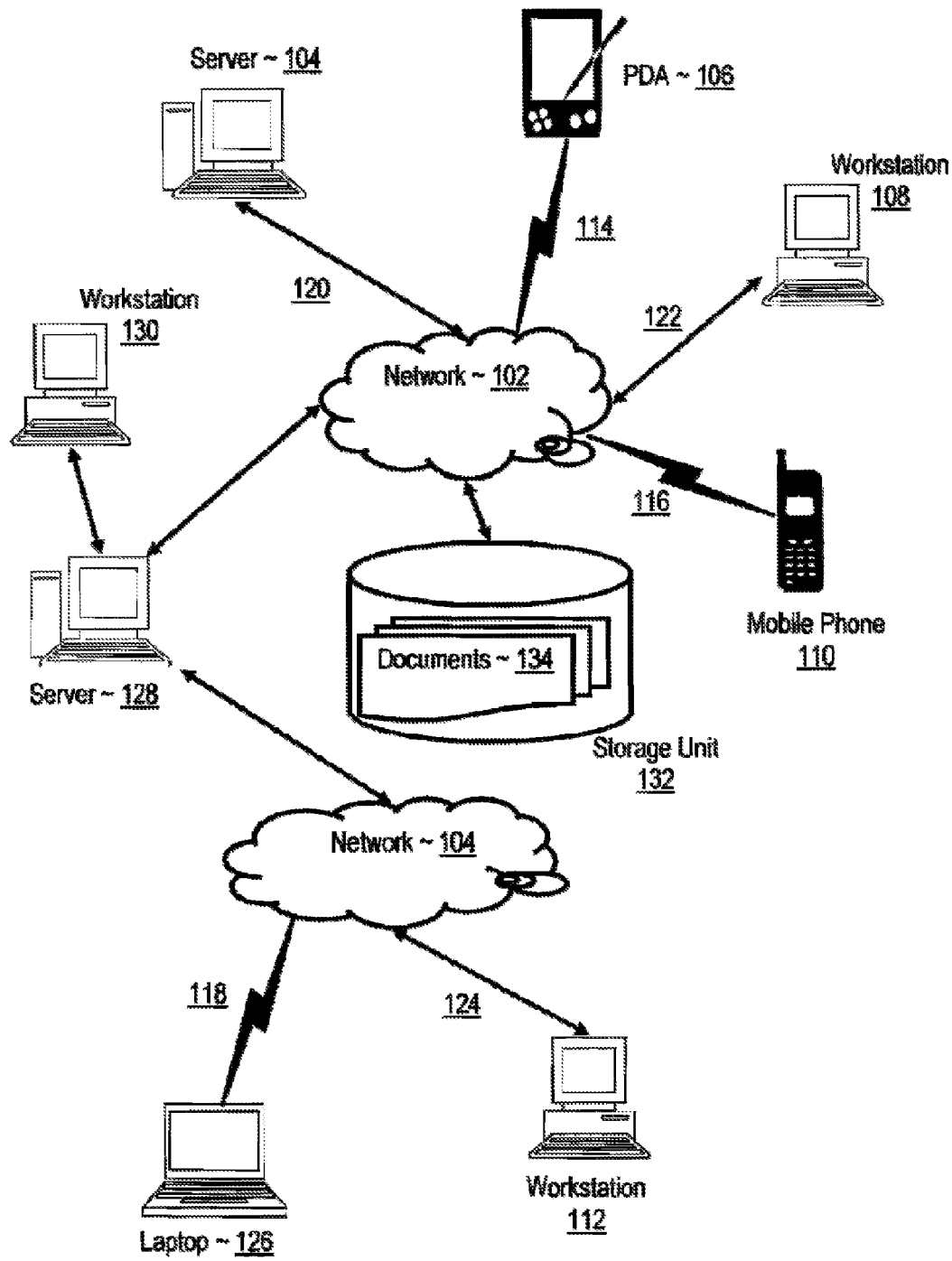
FIG. 1 depicts an architecture for a data processing system in which various embodiments of the present invention may be implemented.

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Introduction

Exemplary embodiments are described generally in this specification in terms of methods for image distribution for dynamic server pages in data processing systems. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention. Suitable programming means include, for example, systems comprised of processing units and arithmetic-logic circuits connected to computer memory. Such systems generally have the capability of storing in computer memory programmed steps of methods according to exemplary embodiments for execution by a processing unit. Generally in such systems, computer memory is implemented in many ways as will occur to those of skill in the art, including magnetic media, optical media, and electronic circuits configured to store data and program instructions.

Further, embodiments may be implemented as a computer program product for use with any suitable data processing system. Embodiments of a computer program product may be implemented as a diskette, CD ROM, EEPROM ('flash') card, or other magnetic or optical recording media for storage of machine-readable information as will occur to those of skill in that art. Persons skilled in the art will immediately recognize that any computer system having suitable programming means will be capable of executing the steps of methods according to exemplary embodiments as included in a computer program product. Moreover, persons skilled in the art will recognize immediately that, although many of the exemplary embodiments described in this specification are oriented to software installed on computer hardware, nevertheless, alternative embodiments implemented as firmware or other computing machinery are well within the scope of the present invention.

DEFINITIONS

"BLOB" stands for "Binary Large OBject," a collection of binary data stored as a single entity in a database. BLOBs are used to hold multimedia content such as video and audio clips, although they are also used to store software, even executable binary code. Images are typically expressed in binary encodings such as JPEG and GIF, and BLOBs are useful for storing images according to various embodiments of the present invention. Not all databases support BLOBs.

"Browser" means a web browser, which is a communications application for locating and displaying web pages. Browsers typically include a markup language interpreter, web page display routines, and an HTTP communications client. Typical browsers can display text, graphic images, audio and video. Browsers are operative in network-enabled devices, including wireless network-enabled devices such as network-enabled PDAs and mobile telephones. Browsers in wireless network-enabled devices often are downsized browsers called "microbrowsers." Microbrowsers in wireless network-enabled devices often support markup languages other than HTML, including for example, WML, the Wireless Markup Language.

"CGI" means "Common Gateway Interface," a standard technology for data communications of resources between web servers and web clients. CGI provides a standard interface between servers and server-side 'gateway' programs that administer actual reads and writes of data to and from files systems and databases.

"Client," "client device," "client machine," or "client computer" means any computer or process requesting a service of another computer system or process using a protocol. Clients include, for example, personal computers, mainframes, PDAs, mobile telephones, laptop computers, devices capable of wireless as well as wireline communications, and any instrument capable of administering search queries and search results or responses. Clients may further include communications software applications that establish connections for data communications with servers and issue requests for documents, images, and other resources.

A "communications application" is any data communications software capable of sending and receiving images distributed for documents or other data streams in data processing systems. Examples include browsers, microbrowsers, special purpose data communications systems, server applications, and others as will occur to those of skill in the art.

"CPU" means 'central processing unit.' The term 'CPU' as it is used in this disclosure includes any form of computer processing unit, regardless whether single, multiple, central, peripheral, or remote, in any form of computing machinery, including client devices, servers, and so on.

"Data processing system" means one or more computers, peripheral equipment, and software that performs data processing. Data processing system is synonymous with 'computer system,' 'computing system,' and 'information processing system.'

A "data stream" is any resource on any data processing system whose contents are organized by markup. Data streams include, for example, static files in markup languages, such as static HTML files or static HDML files. Data streams also include dynamically-generated content such as query results and output from CGI scripts, Java.™ servlets, Active Server Pages ("ASPs"), Java Server Pages ("JSPs"), and other kinds of dynamically-generated content as will occur to those of skill in the art.

"GUI" means 'graphical user interface.'

"HDML" stands for 'Handheld Device Markup Language,' a markup language used to format content for web-enabled mobile phones. HDML is proprietary to Openwave Systems, Inc. and can only be operated on phones that use Openwave browsers. Rather than WAP, HDML operates over Openwave's Handheld Device Transport Protocol ("HDTP").

"HTML" stands for 'HyperText Markup Language,' a standard markup language for displaying web pages on browsers.

"HTTP" stands for 'HyperText Transport Protocol,' a standard data communications protocol of the World Wide Web.

A "hyperlink," also referred to as "link" or "web link," is a reference to a resource name or network address that allows the named resource or network address to be accessed. More particularly in terms of the present invention, invoking a hyperlink implements a request for access to a resource, generally a document. Often a hyperlink identifies a network address at which is stored a resource such as a web page or other document. Hyperlinks are often implemented as anchor elements in markup in documents. As the term is used in this specification, however, hyperlinks include links effected through anchors as well as URIs invoked through 'back' buttons on browsers, which do not involve anchors. Hyperlinks include URIs typed into address fields on browsers and invoked by a 'Go' button, also not involving anchors. In addition, although there is a natural tendency to think of hyperlinks as retrieving web pages, their use is broader than that. In fact, hyperlinks access "resources" generally available through hyperlinks including not only web pages but many other kinds of data as well as dynamically-generated server-side output from Java servlets, CGI scripts, and other resources as will occur to those of skill in the art.

An "image" is an electronic representation of a picture produced by means of sensing light, sound, electron radiation, or other emanations foment from the picture or reflected by the picture. An image also can be generated directly by software without reference to an existing picture. Images include pictures of scenes as well as pictures of graphical elements for display on computer screens. Images typically are expressed in digital formats, such as, for example, JPEG, GIF, PNG, TIFF, BIFF, bmp, Clear, FITS, IFF, NFF, OFF, PCX, TGA, and XBM. "JPEG" abbreviates "Joint Photographic Experts Group," the original name of the committee that wrote the standard. "GIF" stands for "Graphics Interchange Format," a format whose compression algorithm is proprietary to Unisys. "PNG" stands for "Portable Network Graphics," a format developed as a non-proprietary alternative to GIF.

"The Internet" is a global network connecting millions of computers utilizing various protocols, including the Internet Protocol or 'IP' as the network layer of their networking protocol stacks. The Internet is decentralized by design, an example of a data processing system. An "internet" (uncapitalized) is any set of networks interconnected with routers.

"LAN" is an abbreviation for "local area network." A LAN is a computer network that spans a relatively small area.

"Markup" means information added to a document to enable a person or system to process it. Markup is composed of syntactically delimited characters added to the data of a document to represent its structure. Markup information can describe the document's characteristics, or it can specify the actual processing to be performed. Markup is composed of markup "elements," each of which is defined by one or more tags. Markup elements may be defined with one or more "attributes." Each attributes has a name and a value. The well known HTML anchor element, for example, includes a start tag <a> and an end tag <a>. The anchor element also attributes including, for example, an HREF attribute that is used to identify a URI for a hyperlink and a NAME attribute that is used to make an anchor available as a hyperlink. An example of an anchor element is:
<a href="http://www.SomeWebSite.com/index.html"> Home </a>

This example establishes the word "Home" as an anchor of a hyperlink to the index.html document located at the URI identified by the HREF element, "http://www.SomeWebSite.com/index.html". This example:
<img src="//www.ibm.com/i/mast_logo.gif" width="150" height="47"/> is an HTML image element <img>. HTML image elements reference images with hyperlinks identified by URIs in their SRC attributes. This example has a SRC attribute with a URI of "//www.ibm.com/i/mast_logo.gif.-" In addition, this example <img> element has attributes defining image width and height. The image element is an example of an "empty" element in that, rather than having both a start tag and an end tag, it is composed of only the single tag <img>.

A "markup language" is a language used to define information (markup) to be added to the content of a document as an aid to processing it. Examples of markup languages include HDML, HTML, WML, XML, and many others. Markup elements in some markup languages are predefined by a standard for the language, as is the case for HDML, HTML, and WML, for example. Markup elements in other markup languages are user defined, which is the case generally for XML and for SGML (the Standard Generalized Markup Language), the language upon which XML is based.

"PDA" refers to a personal digital assistant, a handheld computer useful as a client according to embodiments of the present invention.

"Resource" means any aggregation of information administered in data processing systems according to embodiments of the present invention. Network communications protocols, such as, for example, HTTP, generally transmit resources, not just files. A resource is an aggregation of information capable of being identified by a URI or URL. In fact, the 'R' in 'URI' stands for 'Resource.' The most common kind of resource is a file, but resources include dynamically-generated query results, the output of CGI scripts, dynamic server pages, and so on. It may sometimes be useful to think of a resource as similar to a file, but more general in nature. Files as resources include web pages, graphic image files, video clip files, audio clip files, files of data having any MIME type, and so on. As a practical matter, most HTTP resources, WAP resources, and the like are currently either files or server-side script output. Server side script output includes output from CGI programs, Java servlets, Active Server Pages, Java Server Pages, and so on.

A "server" is a computer that provides shared services to other computers over a network. Examples of servers include file servers, printer servers, email servers, web servers, and so on. Servers include any computer or computing machinery on a network that manages resources, including documents, and responds to requests for access to such resources. A "web server" is a server that communicates with other computers through data communications application programs, such as browsers or microbrowsers, by means of hyperlinking protocols such as HTTP, WAP, or HDTP, for example, in order to manage and make available to networked computers documents, images, and other resources.

"SQL" stands for 'Structured Query Language,' a standardized query language for requesting information from a database. Although there is an ANSI standard for SQL, as a practical matter, most versions of SQL tend to include many extensions. This specification provides examples of database queries against semantics-based search indexes expressed as pseudocode SQL. Such examples are said to be 'pseudocode' because they are not cast in any particular version of SQL and also because they are presented for purposes of explanation rather than as actual working models.

A "Java Servlet" is a program designed to be run from another program rather than directly from an operating system. "Servlets" in particular are designed to be run on servers from a conventional Java interface for servlets. Servlets are modules that extend request/response oriented servers, such as Java-enabled web servers. Java servlets are an alternative to CGI programs.

"TCP/IP" refers to two layers of a standard OSI data communications protocol stack. The network layer is implemented with the Internet Protocol, hence the initials 'IP.' And the transport layer is implemented with the Transport Control Protocol, referred to as 'TCP.' The two protocols are used together so frequently that they are often referred to as the TCP/IP suite, or, more simply, just 'TCP/IP.' TCP/IP is the standard data transport suite for the well-known world-wide network of computers called 'the Internet.'

A "URI" or "Universal Resource Identifier" is an identifier of a named object in any namespace accessible through a network. URIs are functional for any access scheme, including for example, the File Transfer Protocol or "FTP," Gopher, and the web. A URI as used in typical embodiments of the present invention usually includes an internet protocol address, or a domain name that resolves to an internet protocol address, identifying a location where a resource, particularly a document, a web page, a CGI script, or a servlet, is located on a network, often the Internet. URIs directed to particular resources, such as particular documents, HTML files, CGI scripts, or servlets, typically include a path name or file name locating and identifying a particular resource in a file system connected through a server to a network. To the extent that a particular resource, such as a CGI file, a servlet, or a dynamic web page, is executable, for example to store or retrieve data, a URI often includes query parameters, or data to be stored, in the form of data encoded into the URI. Such parameters or data to be stored are referred to as 'URI encoded data,' or sometime as 'form data.'

"URI encoded data" or "form data" is data packaged in a URI for data communications, a useful method for communicating variable names and values in a data processing system such as the Internet. Form data is typically communicated in hyperlinking protocols, such as, for example, HTTP which uses GET and POST functions to transmit URI encoded data. In this context, it is useful to remember that URIs do more than merely request file transfers. URIs identify resources on servers. Such resources may be files having filenames, but the resources identified by URIs also may include, for example, queries to databases, including queries to search engines according to embodiments of the present invention. Results of such queries do not necessarily reside in files, but they are nevertheless data resources identified by URIs and identified by a search engine and query data that produce such resources. An example of URI encoded data is:
http://www.foo.com/cgi-bin/
MyScript.cgi?field1=value1&field2=value2

This example shows a URI bearing encoded data. The encoded data is the string "field1=value1&field2=value2." The encoding method is to string field names and field values separated by '&' and '=' with spaces represented by '+.' There are no quote marks or spaces in the string. Having no quote marks, spaces are encoded with '+,' and '&' is encoded with an escape character, in this example, '%26.' For example, if an HTML form has a field called "name" set to "Lucy", and a field called "neighbors" set to "Fred & Ethel", the data string encoding the form would be:
name=Lucy&neighbors=Fred+%26+Ethel "URLs" or "Universal Resource Locators" comprise a kind of subset of URIs, such that each URL resolves to a network address. That is, URIs and URLs are distinguished in that URIs identify named objects in namespaces, where the names may or may not resolve to addresses, while URLs do resolve to addresses. Although standards today are written on the basis of URIs, it is still common to such see web-related identifiers, of the kind used to associate web data locations with network addresses for data communications, referred to as "URLs." This specification uses the terms URI and URL more or less as synonyms.

"WAN" means 'wide area network.' One example of a WAN is the Internet.

"WAP" refers to the Wireless Application Protocol, a protocol for use with handheld wireless devices. Examples of wireless devices useful with WAP include mobile phones, pagers, two-way radios, hand-held computers, and PDAs. WAP supports many wireless networks, and WAP is supported by many operating systems. WAP supports HTML, XML, and particularly WML (the Wireless Markup Language), which is a language particularly designed for small screen and one-hand navigation without a keyboard or mouse. Operating systems specifically engineered for handheld devices include PalmOS, EPOC, Windows CE, FLEXOS, OS/9, and JavaOS. WAP devices that use displays and access the Internet run "microbrowsers." The microbrowsers use small file sizes that can accommodate the low memory constraints of handheld devices and the low-bandwidth constraints of wireless networks.

"WML" stands for 'Wireless Markup Language,' an XML language used as a markup language for web content intended for wireless web-enabled devices that implement WAP. There is a WAP forum that provides a DTD for WML. A DTD is an XML 'Document Type Definition.'

"World Wide Web," or more simply "the web," refers to a system of internet protocol ("IP") servers that support specially formatted, hyperlinking documents, documents formatted in markup languages such as HTML, XML, WML, and HDML. The term "web" is used in this specification also to refer to any server or connected group or interconnected groups of servers that implement a hyperlinking protocol, such as HTTP, WAP, HDTP, or others, in support of URIs and documents in markup languages, regardless whether such servers or groups of servers are connected to the World Wide Web as such.

"XML" stands for 'eXtensible Markup Language,' a language that support user-defined markup including user-defined elements, tags, and attributes. XML's extensibility contrasts with most web-related markup languages, such as HTML, which are not extensible, but which instead use a standard defined set of elements, tags, and attributes. XML's extensibility makes it a good foundation for defining other languages. WML, the Wireless Markup Language, for example, is a markup language based on XML. Modern browsers and other communications clients tend to support markup languages other than HTML, including, for example, XML.

Data Processing Systems

Exemplary methods, system, and products for image distribution in data processing systems are now explained with reference to the accompanying drawings, beginning with FIG. 1. FIG. 1 depicts an architecture for a data processing system in which various embodiments of the present invention may be implemented. The data processing system of FIG. 1 includes a number of computers connected for data communications in networks. The data processing system of FIG. 1 includes networks (102, 104). Networks (102, 104) may be connected as LANs, WANs, intranets, internets, the Internet, webs, the World Wide Web itself, or other connections as will occur to those of skill in the art. Such networks are media that may be used to provide data communications connections between various devices and computers connected together within the data processing system.

In FIG. 1, servers 128 and 104 and storage unit 132 connect to network 102. In addition, several exemplary client devices including a PDA 106, a workstation 108, and a mobile phone 110 are connected for data communications to network 102. Network-enabled mobile phone 110 connects to network 102 through wireless link 116, and PDA 106 connects to network 102 through wireless link 114. In the example of FIG. 1, server 128 connects directly to client workstation 130 and network 104 (which may be a LAN). Network 104 incorporates wireless communication links supporting a wireless connection to laptop computer 126. Network 104 also incorporates wireline protocols supporting a wired connection to client workstation 112.

The terms 'client' and 'server' are used generally to explain data communications according to the exemplary embodiments set forth in this disclosure. This use of the terms 'client' and 'server,' however, does not exclude peer to peer communications.

The particular servers and client devices illustrated in FIG. 1 are for explanation, not for limitation. Data processing systems useful according to various embodiments of the present invention may include additional servers, clients, routers, other devices, and peer-to-peer architectures, not shown in FIG. 1, as will occur to those of skill in the art. Networks in such data processing systems may support many data communications protocols, such as, for example, TCP/IP, HTTP, WAP, HDTP, and others as will occur to those of skill in the art. Various embodiments of the present invention may be implemented on a variety of hardware platforms in addition to those illustrated in FIG. 1.

Figure 2:
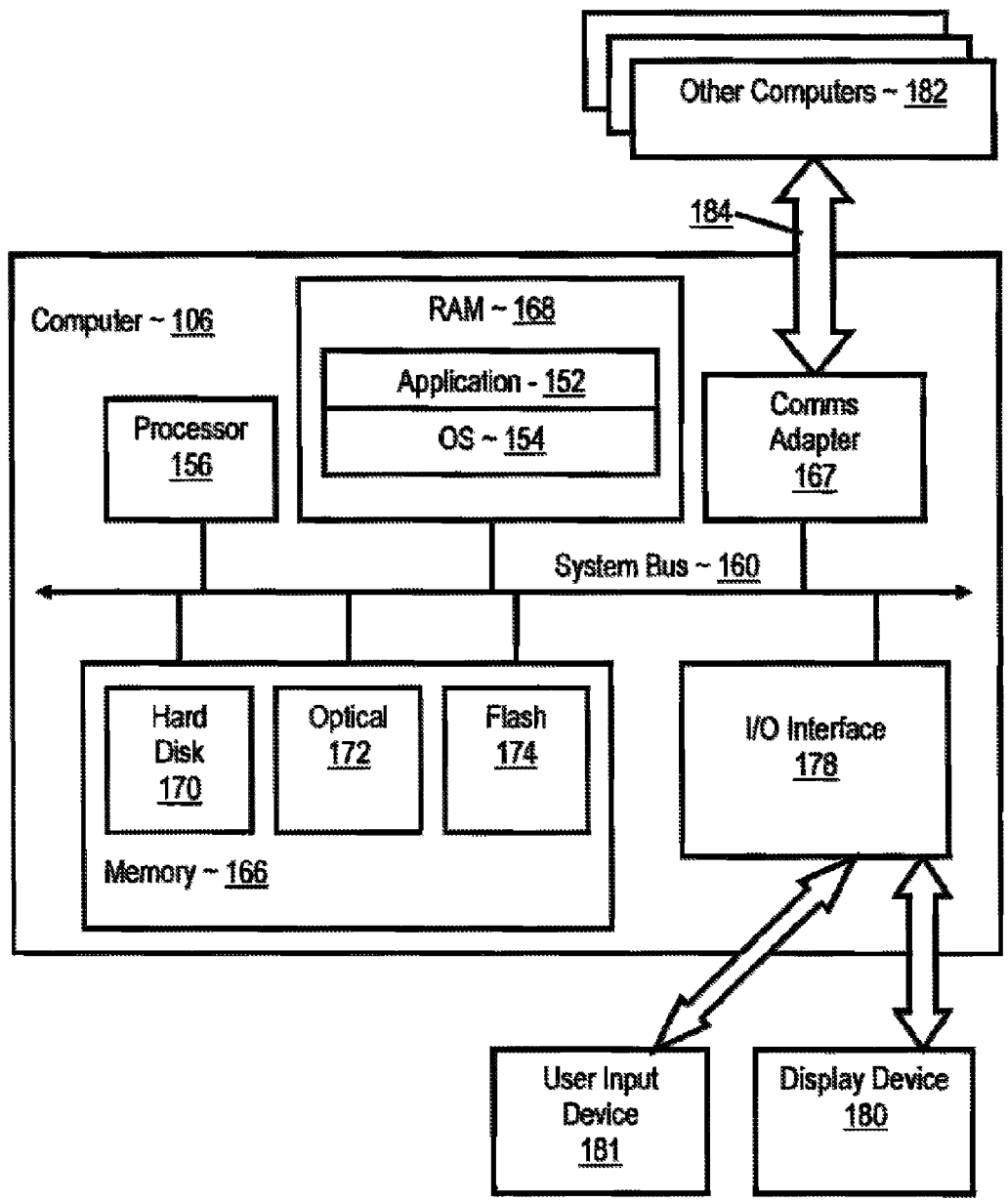
FIG. 2 sets forth a block diagram of automated computing machinery.

FIG. 2 sets forth a block diagram of computing machinery that includes a computer 106, such as a client or server, useful in systems for image distribution in data processing systems according to embodiments of the present invention. The computer 106 of FIG. 2 includes at least one computer processor 156 or 'CPU' as well as random access memory 168 ("RAM"). Stored in RAM 168 is an application program 152. Application programs useful in implementing inventive methods of the present invention include servlets and CGI scripts running on servers and data communications programs such as browsers or microbrowsers running on client machines. Also stored in RAM 168 is an operating system 154. Operating systems useful in computers according to embodiments of the present invention include AIX.™, Linux, Microsoft NT.™, and many others as will occur to those of skill in the art.

The computer 106 of FIG. 2 includes computer memory 166 connected through a system bus 160 to the processor 156 and to other components of the computer. Computer memory 166 may be implemented as a hard disk drive 170, optical disk drive 172, electrically erasable programmable read-only memory space 'EEPROM' or 'Flash' memory) 174, RAM drives (not shown), or as any other kind of computer memory as will occur to those of skill in the art.

The example computer 106 of FIG. 2 includes communications adapter 167 implementing data communications connections 184 to other computers 182, servers, clients, or networks. Communications adapters implement the hardware level of data communications connections through which client computers and servers send data communications directly to one another and through networks. Examples of communications adapters include modems for wired dial-up connections, Ethernet (IEEE 802.3) adapters for wired LAN connections, and 802.11b adapters for wireless LAN connections.

The example computer of FIG. 2 includes one or more input/output interface adapters 178. Input/output interface adapters in computers implement user-oriented input/output through, for example, software drivers and computer hardware for controlling output to display devices 180 such as computer display screens, as well as user input from user input devices 181 such as keyboards and mice.

Receiving and Displaying Images

Figure 3:
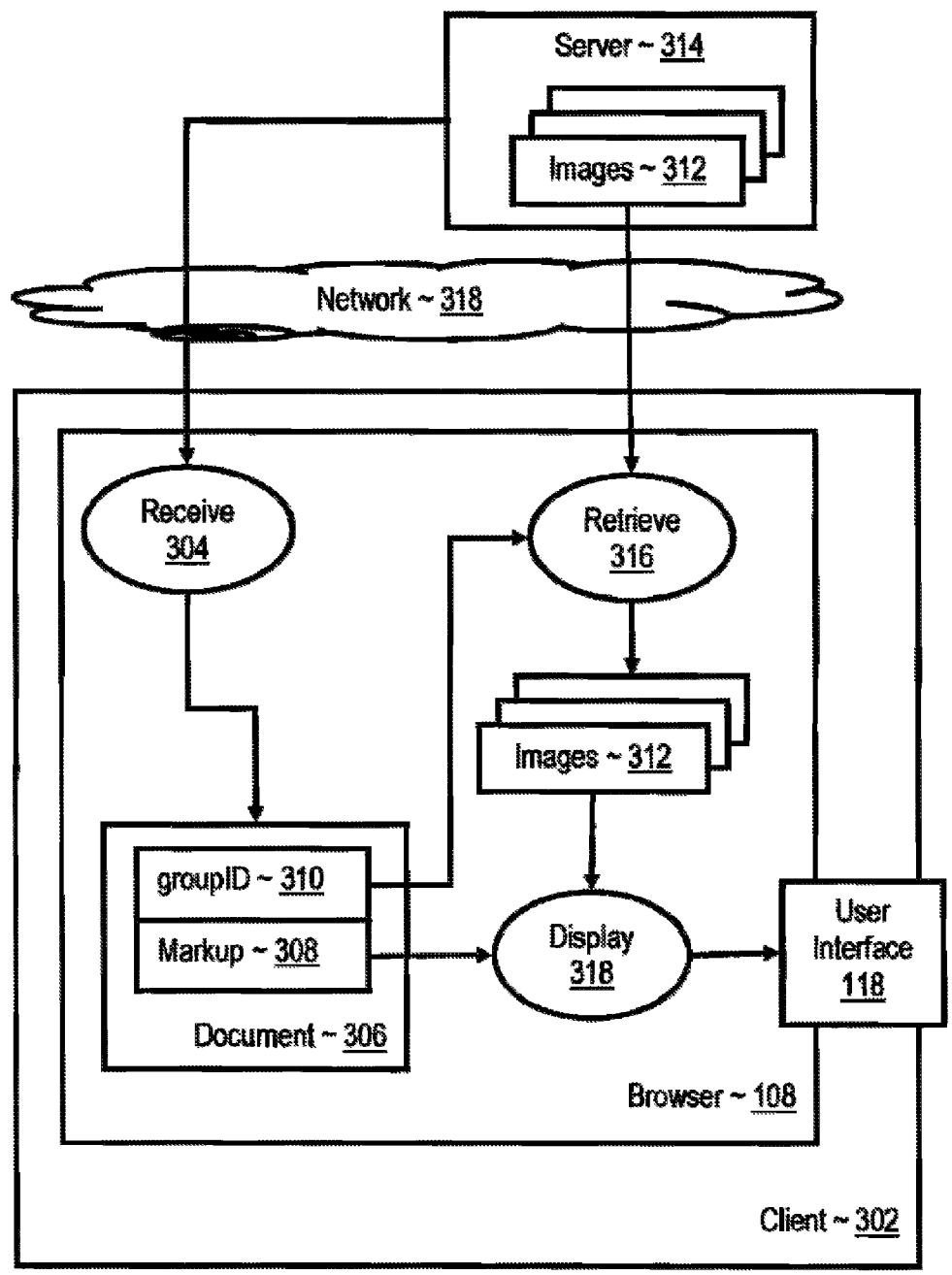
FIG. 3 sets forth a data flow diagram illustrating an exemplary method for distributing images in a data processing system.

FIG. 3 sets forth a data flow diagram illustrating an exemplary method for distributing images in a data processing system that includes receiving (304) in a client (302) a data stream (e.g., document 306) for display, the document (306) having markup (308) according to a markup language, the document further having an image group identifier (310) identifying a group of images (312). In the case of the web as a data processing system, receiving a document occurs because a user invokes a hyperlink through a data communications application such as a browser or microbrowser, and the application sends to a server identified in the hyperlink a request message according to a communication protocol supported on the web, such as HTTP, WAP, and so on, receiving in response the document identified in the hyperlink, which typically is a web page (static or dynamically generated on the server) expressed in a markup language such as HTML or WML.

In this example, the document includes an image group identifier (310) identifying a group of images (312). An image group identifier (310) may be included in a document as shown by the <IMGDB> element in the following exemplary markup:

```
<HTML> <HEAD> <TITLE>Business Partner support from IBM
PartnerWorld</TITLE> </HEAD> <BODY> <IMGDB
src="http://www.ibm.com/cgibin/retrieve.cgi?imageGroupID=
myGroup" /> <table width="760" border="0"
cellspacing="0" cellpadding="0"> <IMGID src=
"myGroup.mast_logo.gif " border="0" alt="IBM"
width="150" height="47"/></td><td width="310"
class="tbg"><a href="#main"> <IMGID src=
"myGroup.c.gif " border="0" width="1" height="1"
alt="Skip to main content"/></a></td> <table border=
"0" cellpadding="0" cellspacing="0"> <form name=
"Search" method="get" <input type="hidden" name=
"v" value="11" size="15"/><tr> <IMGID src=
"myGroup.printer.gif " width="23" height="19" alt=
"Link to printable version of page"></td> <tr valign="middle"
><td> <IMGID src="myGroup.pwhome.jpg" width="610"
height="52" alt="IBM PartnerWorld home header graphic" />
</td><td><input maxlength="100" class="input" size=
"15" name="q" value="" type="text"/></td- >
<td> <IMGID src="myGroup.fw.gif" width="16" height="16"
alt=""/></td> </BODY> </HTML>
```

This example is derived from the prior art example set forth above. This example, however, contains a new markup element: <IMGDB>. The new markup element <IMGDB> represents an instruction to retrieve, during a single communications connection to the server, all images identified by an image group identifier, which is set forth in a 'src' attribute in the new markup element shown above. In this example, the image group identifier is URI encoded as "myGroup."

Because <IMGDB> is new, data communications applications such as browsers or microbrowsers may be adapted to respond to the new element by alterations at the source code level, by use of downloadable plug-ins such as Java applets, other client-side scripting means, or in other ways as will occur to those of skill in the art. The name of the new element <IMGDB> is an example only, not a limitation of the invention. The new element can be named anything, <IMG-DOWNLOAD>, <GET-IMG>, <GET-GROUP>, and so on, as will occur to those of skill in the art, and all such names are well within the scope of the present invention.

The method of FIG. 3 includes retrieving (316) the images, from a server (314) in the data processing system, in dependence upon the image group identifier (310). In typical servers according to the present invention, images are stored in files systems or databases according to their respective image group identifiers. That is, each image is stored in association with an image group identifier so that all images in a group can be retrieved, gathered, and returned at approximately the same time, so long as the server knows the desired image group identifier. Retrieving (316) images in dependence upon the image group identifier (310) therefore is typically carried out by transmitting from the client to a server identified in markup a request message expressed in a data communications protocol and bearing an image group identifier. In the example under discussion, the markup is:
<IMGDB src="http://www.ibm.com/cgi-bin/retrieve.cgi?imageGroupID=myGroup"/>

The target server is identified by the domain name "www.ibm.com;" the protocol is identified as "http;" and the image group identifier is represented as "myGroup." Retrieving (316) images in dependence upon the image group identifier (310) therefore in this example is carried out by transmitting from a client browser to the server at "www.ibm.com" an HTTP request message bearing the image group identifier URI encoded as "myGroup." In this example, the request message actually requests the resource identified as "/cgi-bin/retrieve.cgi," which is a CGI script called by the server that takes a call parameter of an image group identifier, retrieves from a database the images associated with the image group identifier, and returns the images to the calling server, which in turn returns them to the requesting client in an HTTP response message.

The CGI script "retrieve.cgi" is server-side functionality for retrieving images. The use of a CGI script, however, is only for explanation, not a limitation of the invention. On a server supporting IBM's DB2 database management system, server-side functionality for retrieving images may be implemented as a DB2 'stored procedure.' On a Java server, for a further example, server-side functionality for retrieving images can be implemented as a servlet and invoked with a URI such as, for example: src="http://www.ibm.com/servlets/retrieve?imageGroupID=myGroup".

Advantageously, all images in the group are returned at approximately the same time, that is, typically through a single request/response sequence. In fact, in many implementations of the method of FIG. 3, retrieving (316) images (312) is carried out by retrieving all images in a group identified by an image group identifier (310) before displaying any of the images. Documents may include more than one markup element requiring an image group, that is, in the current example, more than one <IMGDB> element. In a document having only one <IMGDB> element, however, downloading all images in a group at the same time reduces the HTTP request/response traffic from one round trip per image to one round trip per document.

Typically according to the example of FIG. 3, retrieving (316) the images includes aggregating the images in a data structure on the client. Aggregating images in a data structure on the client may be carried out, for example, by use of an array of structures in C, a two-element container object in C++, a hashtable in Java, and so on as will occur to those of skill in the art. An example of such an aggregation is a table named for an image group identifier, "myGroup," having two columns, one storing image identifiers and the other storing images:
8 myGroup Image IDs Images mast_logo.gif - - - c.gif - - - printer.gif - - - pwhome.jpg - - - fw.gif - -

This example, with a table named "myGroup" for an image group identifier and a column containing the image identifiers from the exemplary HTML segment above, supports references to the images of the form: groupImageID.imageID, so that a reference to myGroup.mast_logo.gif may be used by a browser or other communications application to retrieve the first image from the table. A reference to myGroup.c.gif returns the second image in the table, myGroup.printer.gif the third image, and so on. The images in this table are represented by dashes only because in this example the images are like BLOBs, the actual raw binary images themselves, stored in computer memory client-side, ready for display through the browser.

In typical implementations of the method of FIG. 3, the markup (308) includes markup elements that represent instructions to display images at display locations. The markup elements in this example include identifications of images in a data structure on the client, and the method includes displaying (318) the images on the client (302) according to the markup (308). The HTML segment under discussion, for example, contains not only the new markup element <IMGDB>, but another new markup element as well: <IMGID>. The new element <IMGID> represents an instruction to display an image at a display location corresponding to the element's location in the logical structure of a document, that is, the structure provided by the markup itself, HTML tables, HTML paragraph marks, HTML line marks, HTML forms, and so on. The new element <IMGID> includes identifications of images in a data structure on the client. In this example, the identifications of images in a data structure on the client take the form described above: groupImageID.imageID. More particularly, the example HTML segment sets forth five <IMGID> elements:

9 <IMGID src="myGoup.mast_logo.gif" border="0" alt="IBM" width="150" height="47"/> <IMGID src="myGoup.c.gif" border="0" width="1" height="1" alt="Skip to main content"/>
<IMGID src="myGoup.printer.gif" width="23" height="19" alt="Link to printable version of page"> <IMGID src="myGoup.pwhome.jpg" width="610" height="52" alt="IBM PartnerWorld home header graphic" /> <IMGID src="myGoup.fw.gif" width="16" height="16" alt=""/>

The 'src' attributes in these examples, rather than identifying images located in remote file systems on remote servers across a data processing systems as was the case in prior art, now point to images in a data structure on the client machine itself, ready for quick retrieval and display. In the first example <IMGID> element, the attribute src="myGoup.mast_logo.gif" identifies an image associated with the image identifier "mast_logo.gif" in a data structure on the client named "myGroup." In the second example <IMGID> element, the attribute src="myGoup.c.gif" identifies an image associated with the image identifier "c.gif" in a data structure on the client named "myGroup." In the third example <IMGID> element, the attribute src="myGoup.printer.gif" identifies an image associated with the image identifier "printer.gif" in a data structure on the client named "myGroup." And so on.

Storing and Sending Images

Figure 4:
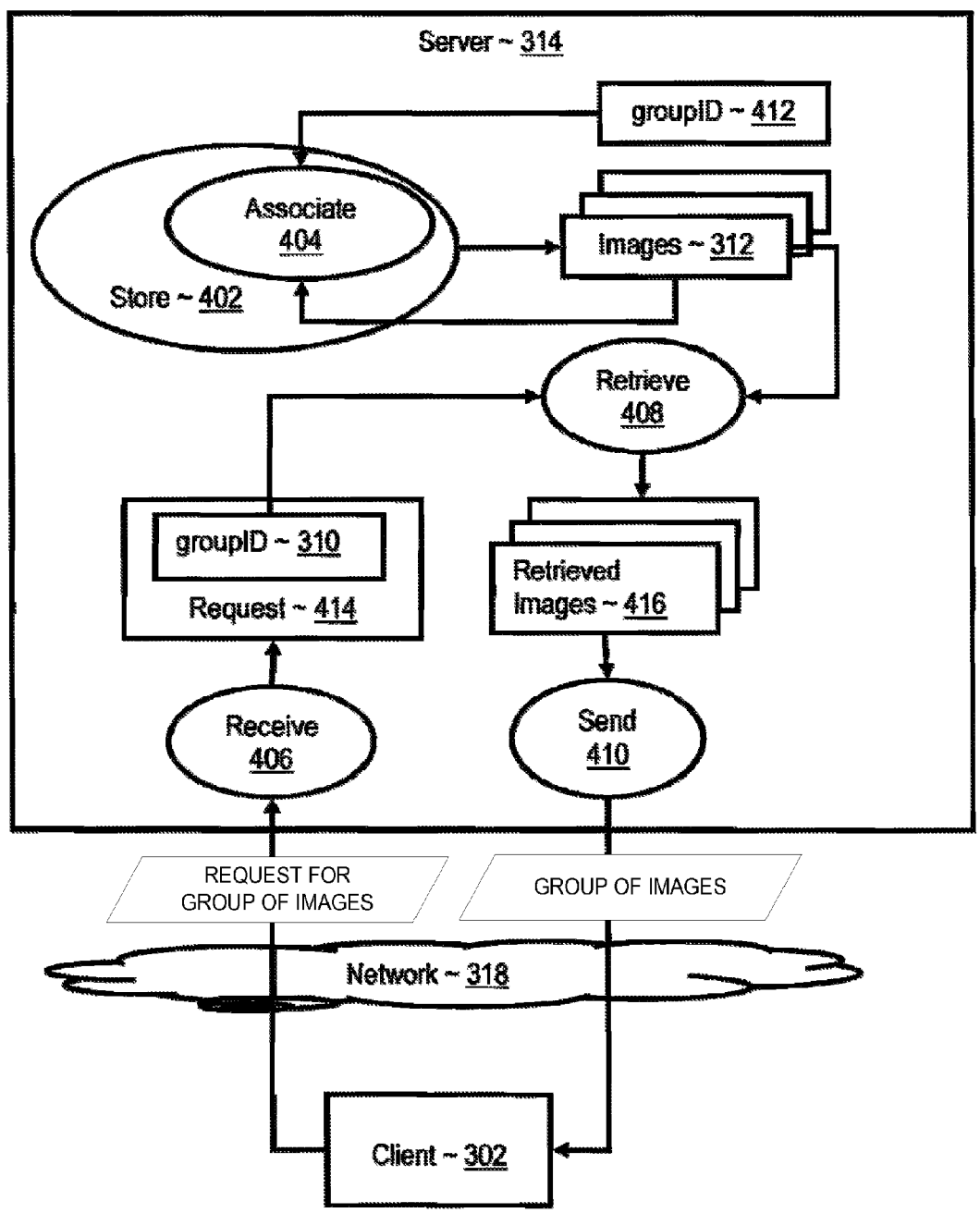
FIG. 4 sets forth a data flow diagram illustrating a further exemplary method for distributing images in a data processing system.

FIG. 4 sets forth a data flow diagram illustrating a further exemplary method for distributing images in a data processing system that includes storing 402 images 312 on a server 314 and, in the process of storing the images, associating 404 each image with at least one group of images identified by an image group identifier 412.

In some implementations of the method according to FIG. 4, storing 402 images 312 is carried out by storing images as BLOBs in a database. In such implementations, associating 404 each image with at least one group of images is accomplished by storing an image identifier for each BLOB in association with an image group identifier for each file. In other implementations, storing 402 images is carried out by storing images as files on a file system. In such implementations, associating 404 each image with at least one group of images is accomplished by storing a pathname for each file in association with an image group identifier for each file. Either way, the availability of database management tools, automated queries, inserts, deletions, updates, reports, and so on, substantially eases the administrative burden on the server side and speeds response time with respect to methods of prior art.

Figure 5:
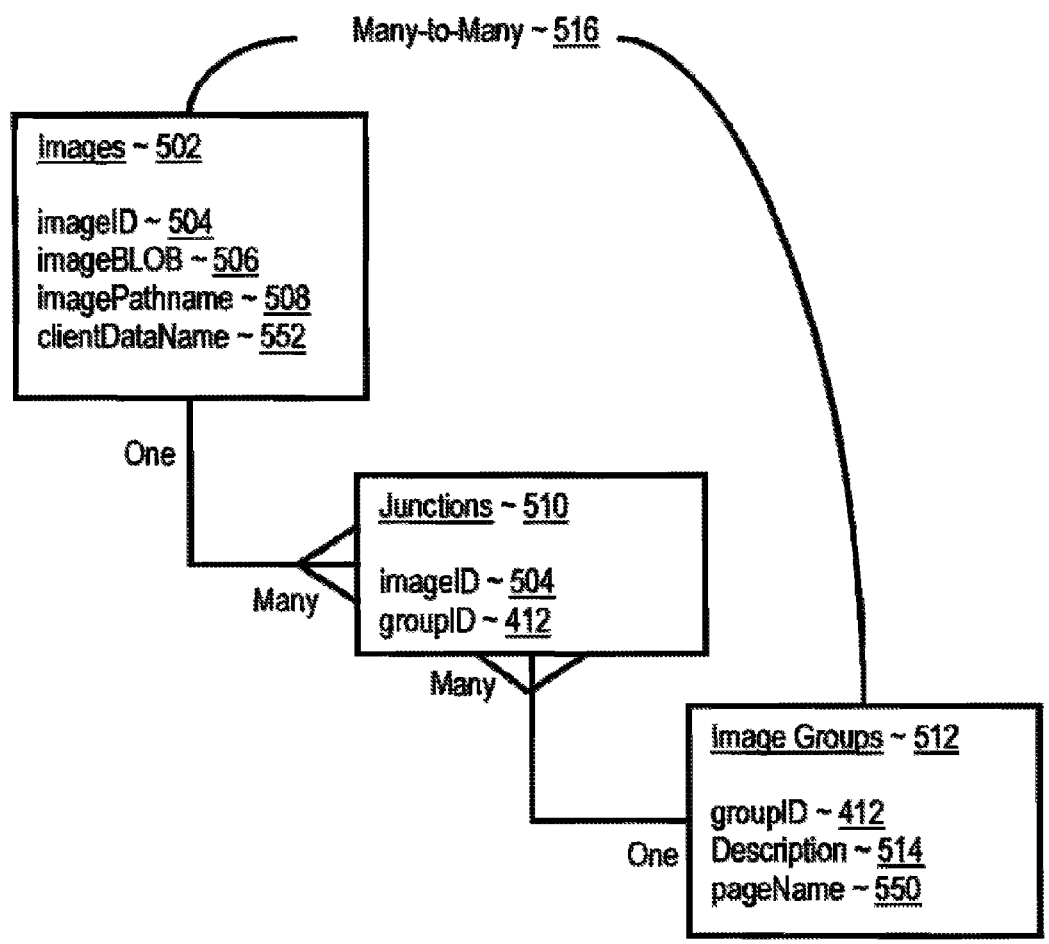
FIG. 5 sets forth a database relationship diagram illustrating relations among records representing images and groups of images.

Methods for storing (402) images (312) and associating (404) images with groups are further explained with reference to FIG. 5. FIG. 5 sets forth a database relationship diagram illustrating relations among records representing images and groups of images. In the table named "Image Groups" 512, each record represents a group of images, and each record includes an image group identifier 412 and a text description field 514. In the table named "Images" 502, each record represents an image, and each record includes an image identifier 504, typically an identification code implemented as a string such as an image file name or an integer code, for example. The Images table 502 in FIG. 5 also includes images, stored in the table in the form of BLOBs 506. Moreover, the Images table 502 illustrates a further alternative form of image storage in which the images themselves are stored on a file system and the Image table 502 stores, for each image, a pathname specifying where in a file system the image is found in an image file.

A pathname is a sequence of subdirectory names that identifies a file. Every file in a file system typically has a name, called a filename, so the simplest type of pathname is just a filename. When a pathname is specified as only a filename, an operating system looks for that file in a current working directory. If the file resides in a different directory, however, the operating system requires more information to find the file. The additional information is provided by specifying a path that the operating system must follow through a file system to find the file. The pathname always starts from a working directory or from a root directory. Each operating system has its own rules for specifying paths. In DOS, for example, the root directory is named .backslash., and subdirectories are separated in pathnames by additional backslashes. In UNIX, the root directory is named/, and subdirectories are separated in pathnames by additional slashes. In Macintosh operating systems, subdirectories in pathnames are separated by colons.

It is clear to readers of skill in the art that the Images table 502 and the Image Groups table 512 advantageously will have a many-to-many relationship because each image can be in many groups and each group may have many images in it. The many-to-many relationship is advantageous because it helps to 'normalize' the database, avoiding storing the same image or the same image group definition more than once. The table named "Junctions" 510 in FIG. 5 is a junction table which, in conjunction with the Images table 502 and the Image Group table 512 implements the many-to-many relationship. The Junctions table 510 contains one record for each combination of image and image group. That is, each record in the Junctions table represents one association of an image and an image group, and each record in the Junction table 510 contains an image identifier 504 and an image group identifier 412. The imageID field 504 in the Junctions table 510 is a foreign key to the Images table 502, forming a one-to-many relationship between the Images table 502 and the Junctions table 510. The grouPID field 412 in the Junctions table 510 is a foreign key to the Image Group table 512, forming a one-to-many relationship between the Image Group table 512 and the Junctions table 510. The relationship of the Images table 502 and the Image Groups table 512, therefore, implemented through the Junctions table 510, is many-to-many 516.

The exemplary method of FIG. 4 includes receiving (406) from a client (302) a request (414) for a group of images, the request comprising an image group identifier (310). Receiving a request comprising an image group identifier is typically carried out by receiving in a server, from a client browser, an HTTP request message bearing the image group identifier URI encoded as, for example: "imageGroupID=myGroup." Such a request message typically originates in a client in response to markup like that illustrated earlier by:
<IMGDB src="http://www.ibm.com/cgi-bin/retrieve.cgi?imageGroupID=myGroup"/>

In this example, as described above, the request message actually requests the resource identified as "/cgi-bin/retrieve.cgi," a CGI script called by the server that takes a call parameter of an image group identifier (in this case "myGroup"), retrieves from a database or a file system the images associated with the image group identifier, and returns the images to the calling server, which in turn returns them to the requesting client in an HTTP response message.

The method of FIG. 4 further includes retrieving (408) from storage images (416) identified by the image group identifier (310). In typical servers according to embodiments of the present invention, where images are stored as BLOBs in database records, retrieving images is carried out by parsing request messages into database queries, such as, for example:

```
SELECT imageBLOB FROM images, junctions WHERE
junction.groupID ="myGroup" AND images.imageID =
junctions.imageID;
```

This is an example SQL query having a form like the following: SELECT imageBLOB FROM images, junctions WHERE junction.groupID="/*insert image group identifier here*/" AND images.imageID=junctions.imageID;

Given a request message bearing URI encoded image group identifier "myGroup," parsing the request message includes extracting the image group identifier from the request message and inserting it into the SQL query form. Asserting the example SQL query against a database of the form shown in FIG. 5, extracts from the database all the images in the image group designated as "myGroup."

The method of FIG. 4 also includes sending (410) the retrieved images to the client. In this example, sending retrieved images is carried out by marshalling them into an HTTP response message and transmitting the response message to the client that requested the images. Advantageously by use of this method, all the images for a document may be sent at the same time through a single data communications connection, such as, for example, a TCP/IP connection, representing a substantial efficiency in use of data communications resources and time as compared with prior art.

Figure 6:
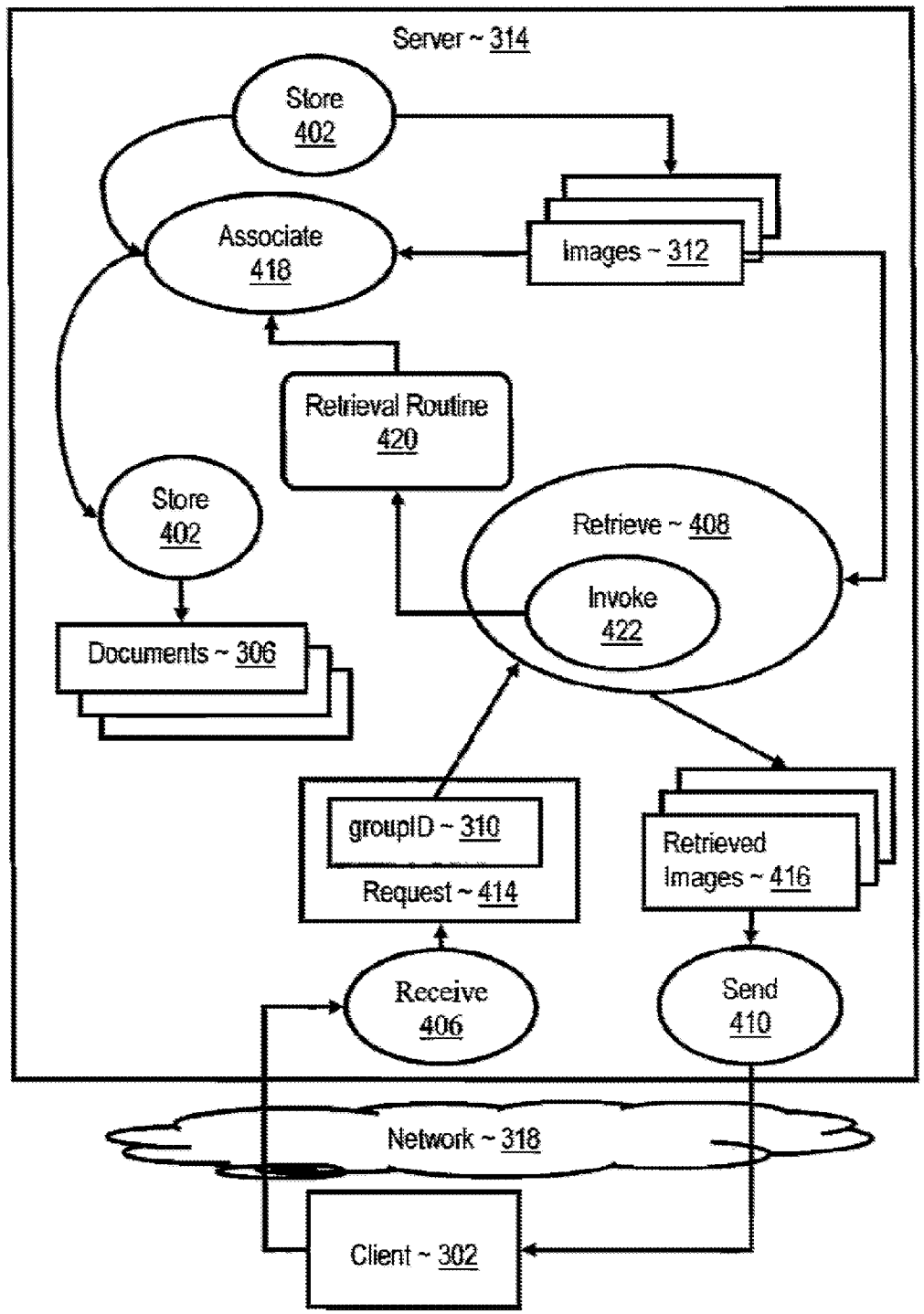
FIG. 6 sets forth a data flow diagram illustrating a still further exemplary method for distributing images in a data processing system.

FIG. 6 sets forth a data flow diagram illustrating a further exemplary-method for distributing images in a data processing system. The method of FIG. 6 includes storing (402) images (312), receiving (406) requests for images, retrieving (408) images, sending (410) retrieved images, and so on, all as described above regarding the method of FIG. 4.

The method of FIG. 6 further includes associating (418) groups of images with an image retrieval routine (420), wherein retrieving the images is carried out by invoking (422) the image retrieval routine. In typical embodiments, an image retrieval routine is server-side functionality for image retrieval, described above as being implemented as a CGI script, a Java servlet, or a DB2 stored procedure. In such embodiments, associating the groups with the routine is carried out by inserting the script, servlet, or stored procedure name in an HTML document in a markup element established for that purpose, such as, for example, the <IMGDB> element described in detail above. Invoking (422) the routine (420) then is carried out by calling the script, servlet, or stored procedure identified in the request message and handing off the image group identifier as a call parameter to the retrieval routine.

The method of FIG. 6 also includes storing (402) on a server (314) documents comprising markup according to a markup language, wherein each document further includes at least one markup element containing an image group identifier identifying a group of images and markup elements that include identifications of individual images in a data structure on the client and represent instructions to display individual images at particular display locations. In typical embodiments, a markup element containing an image group identifier identifying a group of images is implemented as described above with regard to the exemplary <IMGDB> element. In typical embodiments, markup elements that include identifications of individual images in a data structure on the client and represent instructions to display individual images at particular display locations are implemented as described above with regard to the exemplary <IMGID> element.

Image Distribution for Dynamic Server Pages

Readers of skill in the art will recognize that there are many dynamic server pages in computer storage around the world with prior art image elements in them. A well known example of a prior art image element is the HTML element <IMG>. One way to improve existing dynamic server pages according to embodiments of the present invention is to scan through them with a word processor or an automated tool, replace the image elements with <imgid> elements or their like as described above, associate the images of each dynamic server page as a group identified by an image group identifier, and insert the image group identifier in the dynamic server page. This approach, however, is laborious and prone to error because it is the nature of dynamic server pages that the images to be associated with a particular rendering of a page may change each time the page is requested by a client. It would be advantageous to have improved ways of distributing images for dynamic server pages.

Dynamic server pages are web resources that include dynamic content in addition to static content. Static content is the usual text and markup structuring the text. Dynamic content in the context of this discussion is executable program content generally represented by server-side scripting capabilities. In the case of the World Wide Web, for example, web page content includes the usual static content such as display text and markup tags, and, in addition, executable program content. Executable program content includes, for example, Java, VBScript, CGI gateway scripting, PHP script, and Perl code.

Dynamic content is distinguished from the static content in which it is embedded by markup according to the type of dynamic content. Markup identifying both Java scriptlets in JSP dynamic content and VB scripts in ASP dynamic content, for example, is a standard syntax: <% %>.

The kinds of executable program content supported by any particular dynamic server page depends on the kind of dynamic server page engine that is intended to render the executable program content. For example, Java is typically used in Java Server Pages ("JSPs") for Java Server Page engines (sometime referred to in this disclosure as "JSP engines"); VBScript is often used in Active Server Pages ("ASPs") for Microsoft Active Server Page engines (sometime referred to in this disclosure as "ASP engines"); and PHP script, a language based on C, C++, Perl, and Java, is used in PHP pages for PHP: Hypertext Preprocessor engines.

There are several kinds of dynamic server page engines, each of which typically is capable of rendering only one kind of dynamic server page. In each case, the kind of dynamic content rendered by a particular dynamic server page engine is the particular kind of dynamic server page for which the engine was developed in the first place. JSP engines render JSPs. ASP engines render ASPs. PHP engines render PHP pages. And so on.

A web server, upon receiving a request for a particular dynamic server page, sends the dynamic server page to a dynamic server page engine for rendering. The dynamic server page engine 'renders' the dynamic server page by executing its executable program content and placing the output from execution of the executable program content in-line, typically on the standard output of the dynamic server page engine, with the static content in which the dynamic content is embedded.

A web server may support many kinds of dynamic server pages. Which is to say that a web server may support a multiplicity of dynamic server page engines, typically one for each kind of dynamic server page supported. Upon receiving a request for a particular dynamic server page, a web server determines which dynamic page engine is to render the dynamic server page by reference to the location of the dynamic server page engine or by reference to the dynamic server page's filename, or, more particularly, to the filename's extension. A URI requesting:
http://www.foo.com/cgi-bin/someCGIScript.cgi, for example, is directed to a CGI engine ("a Common Gateway Interface") because the dynamic server page someCGIScript.cgi is located in a subdirectory /cgi-bin/ known to house CGI scripts or because the filename extension 'cgi' identifies someCGIScritp.cgi as a CGI script. Similarly, a URI requesting:
http://www.foo.com/jspPages/someJSPPage.jsp is sent for rendering to a JSP engine because it is located in the JSP subdirectory /jspPage/ or because of its filename extension 'jsp.' Similarly, the dynamic server page identified by this URI:
http://www.foo.com/aspPages/someASPPage.asp is sent to an ASP engine, and the dynamic server page identified by this URI:
http://www.foo.com/phpPages/somePHPPage.php is sent to a PHP engine.

Figure 7:
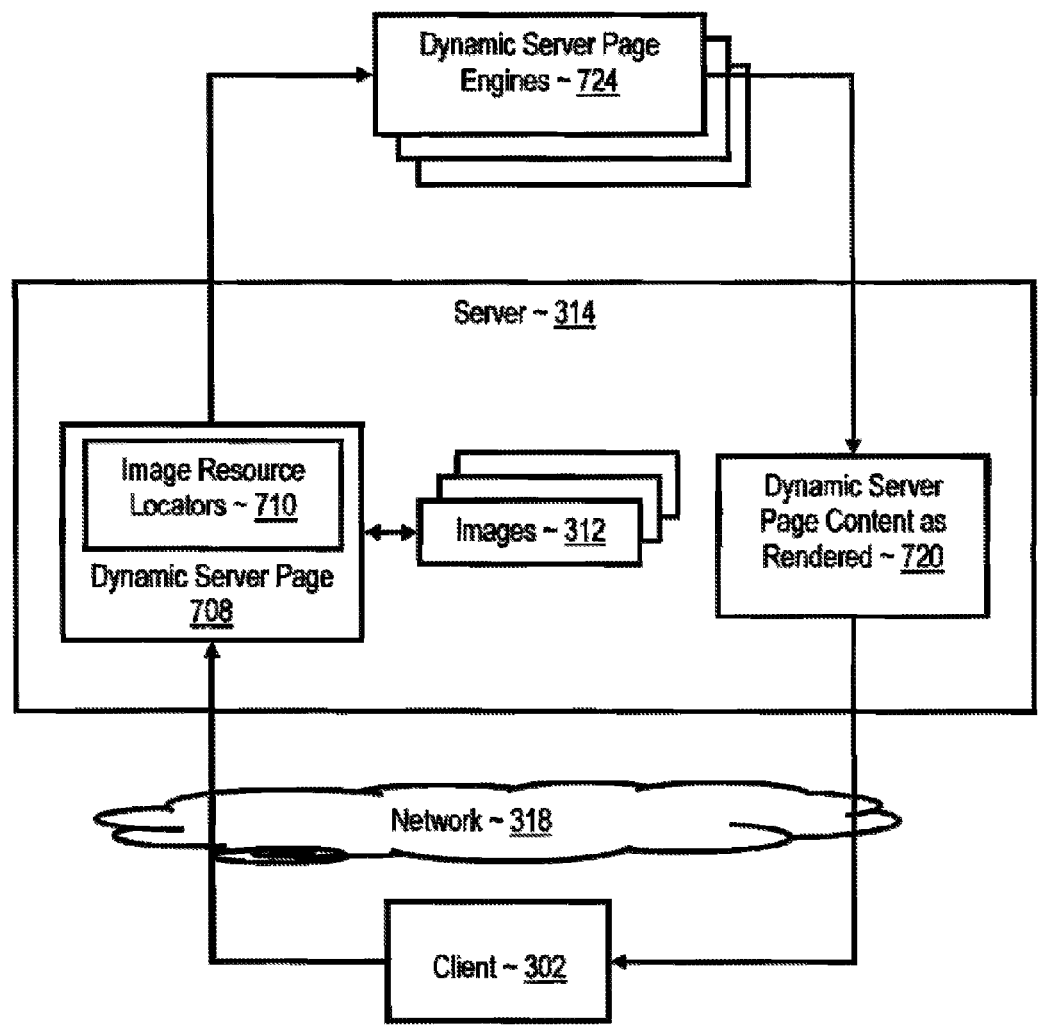
FIG. 7 illustrates a computing architecture in which improved methods of image distribution for dynamic server pages may be implemented.

FIG. 7 illustrates a computing architecture in which improved methods of image distribution for dynamic server pages may be implemented. The architecture of FIG. 7 includes a web server 314 that stores images 312 associated with a dynamic server page 808. The dynamic server page 708 includes image resource locators 710 associating the dynamic server page 708 with the images 312. An example of an image resource locator is shown by the following HTML image element:

---

17 <img src="//www.ibm.com/i/v11/m/en/mast_logo.gif" border="0", where the 'src' attribute's value, "//www.ibm.com/i/v11/m/en/mast_1-ogo.gif," is a URI identifying the storage location of an image file named 'mast_logo.gif.' The image so represented is associated with the dynamic server page by the <img> element setting forth in the dynamic server page the storage location of the image. Associated images may be stored on server 314 or at other storage locations in cyberspace.

---

The architecture of FIG. 7 includes dynamic server page engines 724. Server 314 is connected through network 318 to client 302. Server 314 typically receives from client 302 requests for dynamic server pages. Such requests arrive, for example, in the form of HTTP request messages, WML request messages, HDML request messages, and so on. When server 314 receives a request for a dynamic server page 708, as described above, server 314 determines which of the dynamic server page engines 724 is to render the dynamic server page and sends the dynamic server page to that engine for rendering. Server 314 receives back from the selected dynamic serve page engine 724 the dynamic serve page content as rendered 720. The dynamic server page content as rendered is the original static content including insertions of rendered dynamic content, the output of executing the dynamic content. Server 314 then returns the dynamic server page content as rendered to the requesting client 302.

Figure 8:
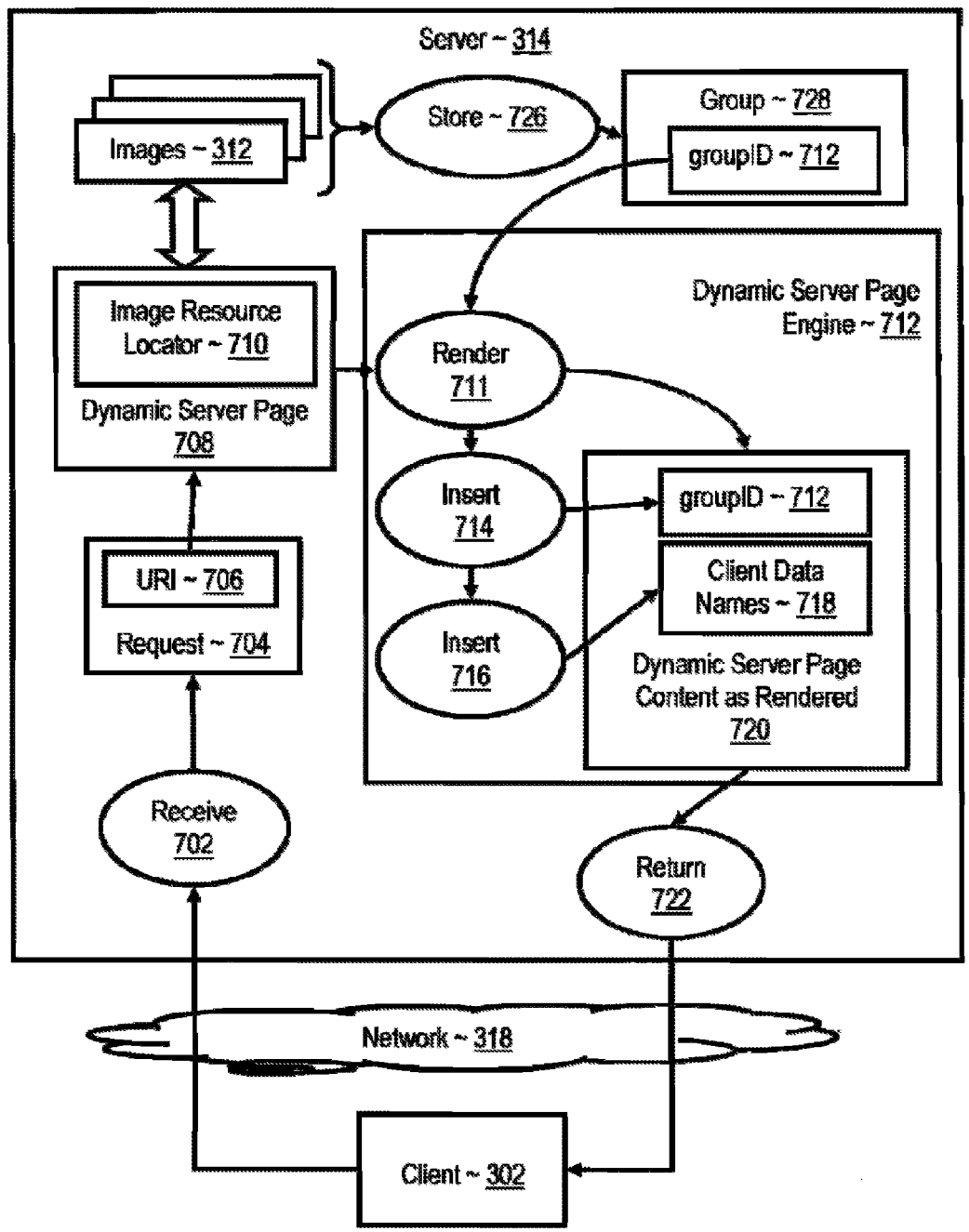
FIG. 8 sets forth a data flow diagram illustrating a method for distributing images in a data processing system that includes receiving 702 a request 704 for a dynamic server page 708.

FIG. 8 sets forth a data flow diagram illustrating a method for distributing images in a data processing system that includes receiving 702 a request 704 for a dynamic server page 708. The dynamic server page 708 has a multiplicity of associated images 312. Each image associated with the dynamic server page 708 in the sense that each image's storage location is identified in the dynamic server page by an image resource locator 710. The image resource locator 710 typically is represented in the dynamic server page by a URI in an image markup element, such as, for example, the HTML <IMG> element.

In the example of FIG. 8, the request 704 is an HTTP request message from a client 302. The request message implements a URI 706 identifying the requested dynamic server page 708. Server 314 sends the dynamic server page 708 to a dynamic server page engine 712 where it is rendered 711 into dynamic server page content as rendered 720.

The method of FIG. 8 also includes inserting in the dynamic server page an image group identifier for the images. Image group identifiers, as described in more detail above, are data elements representing identifications codes for groups of images, such as, for example, the imageID at reference 504 in the example data structures of FIG. 5. Inserting 714 an image group identifier 712 typically includes inserting a markup element that includes the image group identifier, where the markup element represents an instruction to a client to retrieve, during a single communication connection to the server, all images identified by the image group identifier. Such a markup element may be represented, for example, as: <IMGDB src="http://www.ibm.com/cgi-bin/retrieve.cgi?imageGroupID=myGroup"/>

In this example, as described above, the request message actually requests the resource identified as "/cgi-bin/retrieve.cgi," a CGI script called by the server that takes a call parameter of an image group identifier (in this case "myGroup"), retrieves from a database or a file system the images associated with the image group identifier, and returns the images to the calling server, which in turn returns them to the requesting client in an HTTP response message.

Although inserting 714 the image group identifier 712 may be implemented as a literal insertion in the dynamic server page itself, the image group identifier is preferably inserted in the dynamic server page content as rendered. It is an advantage of typical embodiments of the present invention that their operations may be transparent to the structure and operation of underlying dynamic server pages. So the underlying pages themselves are preferably left undisturbed, and image group identifiers are inserted in dynamic server page content as rendered 720 by a dynamic server page engine 712.

The method of FIG. 8 also includes inserting 714 in the dynamic server page client data names 718 for the images. Client data names for the images are data element names for client-side storage locations for the images, storage in client-side computer memory. Inserting 716 client data names 718 typically includes inserting in the dynamic server page content as rendered 720 markup elements representing instructions to display the images at client display locations. As explained in more detail above, such markup elements may be represented as:

<IMGID src="myGoup.mast_logo.gif " border="0" alt="IBM" width="150" height="47"/>.

The 'src' attributes in this example, rather than identifying images located in remote file systems on remote servers across a data processing systems as was the case in prior art, now points to an image in a client-side data structure. In this example <IMGID> element, the attribute src="myGoup.mast_logo.gif" identifies an image associated with the image identifier "mast_logo.gif" in a client data structure named "myGroup."

In many embodiments according to the present invention, inserting 716 a client data name 718 for each image is carried out by replacing the image resource locators with client data names. Consider the following example of dynamic server page content as rendered:

<HTML> <HEAD> <TITLE>Business Partner support from IBM PartnerWorld</TITLE> </HEAD>
<BODY> <img src="//www.ibm.com/i/v11/m/en/mast_logo.gif" clientDataName="clientImages.image1">
<img src="//www.ibm.com/i/c.gif"> clientDataName="clientImages.imag- e2"><img src="http://t1d.www-1.cacheibm.com/printer.gif">- ;clientDataName="clientImages.image3">
</BODY> </HTML>

In this example, client data names 'image1,' 'image2,' and 'image3' in a client-side data structure named 'clientImages' have been inserted in the dynamic server page content as rendered. The insertions are in the standard HTML image element <img>. The insertions are implemented, however, with a new markup attribute name 'clientDataName2.' This approach leaves the standard markup element in place and adds a new attribute that may be used by improved browsers to retrieve the images from client-side storage while being ignored by prior art browsers. Alternatively, the prior art image elements may be replaced entirely by new elements, as shown here:

<HTML> <HEAD> <TITLE>Business Partner support from IBM PartnerWorld</TITLE> </HEAD> <BODY> <imgid src="clientImages.image1"/><imgid src="clientImages.image2"/> <imgid src="clientImages.image3- "/> </BODY></HTML>

In this example, the prior art HTML image elements <img> are replaced entirely with new <imgid> elements and the prior art 'src' attribute is modified in usage to identify a client-side storage location of an image rather than setting forth a URI to an image as in prior usage. In addition to the methods described here, other methods of inserting in dynamic server pages client data names for images will occur to those of skill in the art, and all such methods are well within the scope of the present invention.

Although inserting 716 the client data names 718 may be implemented as a literal insertion in the dynamic server page itself, the client data names are preferably inserted in the dynamic server page content as rendered. Inserting the client data names directly into dynamic server pages as such would be prone to error because the images to be associated with a particular rendering of a page may change each time the page is requested by a client. In typical embodiments of the present invention, therefore, client data names 718 for images preferably are inserted in the dynamic server page content as rendered by a dynamic server page engine 712.

The method of FIG. 8 includes returning 722 to the requesting client 302 the dynamic server page content as rendered 720, including the image group identifier and a multiplicity of client data names, one for each image associated with the dynamic server page content as rendered. The client, in the process of displaying the dynamic server page content as rendered, which now appears to the client as a markup document, notes the image group identifier and sends a request for the image group.

Processing from the server's point of view then proceeds as explained above in connection with FIG. 4. That is, the method includes receiving 406 from the client 302 the request 414 for a group of images, where the request includes the image group identifier 310. The request itself is implemented as a communications protocol message, such as, for example, an HTTP request message. The method includes retrieving 408 from storage the images 312 identified by the image group identifier 310. The method also include sending 410 the retrieved images 416 to the client 302.

The method of FIG. 8 includes storing 726 the images as a group 728 on a server. In typical embodiments, storing the images as a group includes storing with the images an image group identifier, a dynamic server page name, and client data names for the images. As described above, the images may be stored as BLOBs in a database system that supports BLOBs, or the images may be stored as image files in a file system with their pathnames databased in association with image identification codes, all as shown, for example, in the exemplary data structures of FIG. 5. The structures of FIG. 5 include storage for an image group identifier 412, a dynamic server page name 550, and a client data name for each image 552. Storing a dynamic server page name 550 with the image group 512 enables a server according to embodiments of the present invention to determine, upon subsequent requests for a particular dynamic server page, whether a group of image for that dynamic server page has been stored previously. If a group of images for that dynamic server page has been stored previously, then the efficiency of the process of storing a group of images for that dynamic server page may be improved despite the fact that the exact same group of images may not be stored due to the dynamic nature of dynamic server pages.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for distributing images as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of distributing images from a server for web pages, the method comprising:
   receiving a request from a client for a group of images associated with a web page, wherein the request encodes an image group identifier and a retrieving function;
   executing the retrieving function with the image group identifier to obtain the group of images; and
   in response to the request, transmitting the group of images over a number of data communication connections between the client and the server, wherein the number of data communication connections is less than a number of images in the group of images.

2. The method of claim 1, wherein said executing the retrieving function with the group image identifier comprises invoking a database retrieval operation via the retrieving function, wherein the database retrieval operation is invoked with the image group identifier.

3. The method of claim 2, wherein said executing the retrieving function comprises executing one of a script, servlet, and procedure.

4. The method of claim 2, wherein said invoking the database retrieval operation via the retrieving function comprises accessing a first data structure that associates a second data structure of images and image identifiers with a third data structure of image group identifiers which at least include the image group identifier.

5. The method of claim 1, wherein the number of data communication connections corresponds to a single request-response exchange between the server and the client and the single-request response exchange is in accordance with the hypertext transfer protocol.

6. A computer program product for distributing images from a server for web pages, the computer program product comprising:
   a computer readable storage medium having computer usable program code embodied therewith, the computer usable program code comprising a computer usable program code configured to,
   receive a request from a client for a group of images associated with a web page, wherein the request encodes an image group identifier and a retrieving function;
   execute the retrieving function with the image group identifier to obtain the group of images; and
   in response to the request, transmit the group of images over a number of data communication connections between the client and the server, wherein the number of data communication connections is less than a number of images in the group of images.

7. The computer program product of claim 6, wherein the computer usable program code configured to execute the retrieving function with the group image identifier comprises the computer usable program code configured to invoke a database retrieval operation via the retrieving function, wherein the database retrieval operation is invoked with the image group identifier.

8. The computer program product of claim 7, wherein the computer usable program code configured to execute the retrieving function comprises the computer usable program code configured to execute one of a script, servlet, and procedure.

9. The computer program product of claim 7, wherein the computer usable program code configured to invoke the database retrieval operation via the retrieving function comprises the computer usable program code configured to access a first data structure that associates a second data structure of images and image identifiers with a third data structure of image group identifiers which at least include the image group identifier.

10. The computer program product of claim 6, wherein the number of data communication connections corresponds to a single request-response exchange between the server and the client and the single-request response exchange is in accordance with the hypertext transfer protocol.

11. A server comprising:
   a processor;
   a communications adapter;
   a system bus coupled with the processor and the communications adapter; and
   a computer readable storage medium having computer usable program code embodied therewith, the computer usable program code comprising a computer usable program code configured to,
   receive a request from a client for a group of images associated with a web page, wherein the request encodes an image group identifier and a retrieving function;
   execute the retrieving function with the image group identifier to obtain the group of images; and
   in response to the request, transmit the group of images over a number of data communication connections between the client and the server, wherein the number of data communication connections is less than a number of images in the group of images.

12. The server of claim 11, wherein the computer usable program code configured to execute the retrieving function with the group image identifier comprises the computer usable program code configured to invoke a database retrieval operation via the retrieving function, wherein the database retrieval operation is invoked with the image group identifier.

13. The server of claim 12, wherein the computer usable program code configured to execute the retrieving function comprises the computer usable program code configured to execute one of a script, servlet, and procedure.

14. The server of claim 12, wherein the computer usable program code configured to invoke the database retrieval operation via the retrieving function comprises the computer usable program code configured to access a first data structure that associates a second data structure of images and image identifiers with a third data structure of image group identifiers which at least include the image group identifier.

15. The server of claim 11, wherein the number of data communication connections corresponds to a single request-response exchange between the server and the client and the single-request response exchange is in accordance with the hypertext transfer protocol.

16. The server of claim 11, wherein the computer usable program code is further configured to record an association of an identifier of the web page, the image group identifier, and the group of images.

* * * * *